United States Patent [19]

Dutta

[11] Patent Number: 5,208,695
[45] Date of Patent: May 4, 1993

[54] OPTICAL MODULATOR BASED ON GAMMA -X VALLEY MIXING IN GAAS-ALAS

[75] Inventor: Mitra Dutta, Matawan, N.J.

[73] Assignee: The United States of America as represented by the Secretary of the Army, Washington, D.C.

[21] Appl. No.: 765,215

[22] Filed: Sep. 20, 1991

[51] Int. Cl.[5] ...................... G02F 1/03; H01L 29/161; H01L 27/14
[52] U.S. Cl. .................................. 359/245; 257/431; 257/12
[58] Field of Search ..................... 357/16, 30; 359/245

[56] References Cited
U.S. PATENT DOCUMENTS
5,093,695 3/1992 Cunningham et al. ............... 357/30

Primary Examiner—Bruce Y. Arnold
Assistant Examiner—Evelyn A. Lester
Attorney, Agent, or Firm—Michael Zelenka; William H. Anderson

[57] ABSTRACT

An optic modulator having a multiple quantum well structure which is fabricated of alternating layers of gallium arsenide and aluminum arsenide such that at zero electric field there is an indirect electron-hole transition between valence and conduction bands of the aluminum arsenide layers and gallium arsenide layers, respectively, and a direct electron-hole transition between the valence and conduction bands of the gallium arsenide wells. At zero field the multiple quantum well behaves much like bulk material due to the matching of the band gap energy levels of the gallium arsenide and aluminum arsenide. However, when a sufficient electric field is applied to the structure the energy levels decouple thereby modulating the wavelength of any light passing through the structure.

5 Claims, 3 Drawing Sheets

OPTICAL MODULATOR BASED ON GAMMA -X VALLEY MIXING IN GAAS-ALAS

GOVERNMENT INTEREST

The invention described herein may be manufactured, used, and licensed by or for the Government of the United States for governmental purposes without the payment to me of any royalties thereon.

TECHNICAL FIELD

The present invention relates to semiconductor electro-optic modulators and more particularly to gallium arsenide aluminum arsenide heterostructures which modulate light transmissions.

BACKGROUND OF THE INVENTION

The quantum confined Stark effect (QCSE) has given rise to several innovations in electro-optic modulators. Such modulators have many applications in communications and special purpose computer systems. The principles behind the QCSE have been more fully explained by D. A. B. Miller et al, in Physics Review, 1985, B32, p1043. Briefly though, the QCSE is a phenomenon which arises when an electric field is applied across the plane of heterostructure superlattices. In a quantum well at zero electric field, the electron and hole energy levels are defined by the well width, and the electrons and holes are strongly confined in the well layer. However, when an electric field is applied, the electrons and holes are moved apart and their energies are altered. This has the effect of shifting the absorption resonance to lower energy as well as modulating the strength of the absorption. This occurs because direct optical absorption of a photon above the band gap energy involves raising an electron from one of the valence bands and putting it in the conduction band, otherwise known as formation of an electron-hole pair. This shift in the absorption resonance, then, provides for the optical modulation of any radiation that is incident to the heterostructure.

Heretofore, several devices have been disclosed that utilize the QCSE. Examples of these devices are found in articles such as D. A. B. Miller, *Quantum Wells for Optical Information Processing*, Optical Engineering, Vol. 26, No.5, page 368, May 1987; Chemla et al, *Electroabsorption by Stark effect on Room-temperature Excitons in GaAs/GaAlAs Mulitple Quantum Well Structures*, Appl. Phys. Lett., Vol. 42, No. 10, page 864, May 15, 1983; and Chemla et al, *Room Temperature Excitonic Nonlinear Absorption and Refraction in GaAs/AlGaAs Multiple Quantum Well Structures*, IEEE Journal of Quantum Engineering, Vol. QE-20, No. 3, March 1984.

Most of the devices disclosed in these publications are engineered such that the heterostructures are lattice-matched to have the electron-hole transitions between the energy gaps of the valence and conduction bands of the quantum wells in direct relation. These devices are commonly called direct band gap devices and are typically fabricated by molecular beam epitaxy techniques or other similar fabrication techiques. As an example, alternate layers of Gallium Arsenide (GaAs) and Aluminum Gallium Arsenide (AlGaAs) are grown one on top of another. Because the larger band gap AlGaAs, "barriers", have both lower valence-band edges and higher conduction-band edges than the GaAs, the alternate thin layers of GaAs result in confinement of both electrons and holes within the GaAs layers, "wells".

Therefore, if the AlGaAs barriers are sufficiently thick, and have a sufficiently large Al concentration so the potential barriers are high, then the penetration of the wave functions from one GaAs layer to another may be discounted for lower energy states within the GaAs layer. D. A. B. Miller et al, *Electrical Field Dependence of Optical Absorption near the Band Gap of Quantum Well Structures*, Physical Review B, Volume 32, No. 2, Jul. 15, 1983. In these prior art devices, an electric field moves the energy levels of the electrons and holes in the quantum well, as well as moving the electrons and holes apart, thereby altering the absorption energy (due to the former) and the strength (due to the latter) of the absorption resonance. These prior art devices had direct gap material (AlGaAs less than 44% Al) as the barrier, and did not utilize any property of the barrier other than the ability of confining the electron and holes.

The present invention, in contrast to the prior art devices, utilizes an indirect band gap heterostructure of GaAs AlAs to produce a optic modulator which operates at a greatly reduced electric field than previous devices.

SUMMARY OF THE INVENTION

An objective of the present invention is to provide for an optic modulator which operates at greatly reduced electric fields and at a higher contrast (on-off ratio).

Another objective of the present invention is to provide for an optic modulator, which in the passive state, has the characteristics of bulk material.

It is still another objective of the present invention to provide for an optic modulator which contains a superelattice in which one of the two alternating materials forming the super-lattice is an indirect bandgap material (e.g. AlAs) while the other material is a direct bandgap material (e.g. GaAs).

In the preferred embodiment of the invention, the invention comprises a GaAs/AlAs heterostructure superlattice wherein the thicknesses of the alternating GaAs and AlAs are chosen such that the el confined electron level is near in energy to the X-valley (the nearest energy level of the conduction band in the adjacent semiconductor barrier layer), thereby forming an in-direct band gap between the GaAs and AlAs layers. The heterostructure is grown on an n+semiconductor substrate with an appropriate ohmic contact for the heterostructure. On top of the heterostructure, a further contact is evaporated to provide for a soldered connection to an appropriate power source. In operation, an electric field is applied to the structure perpendicular to the surface of the heterostructure. Because the heterostructure is designed so that there is a coupling between the GaAs layers at zero field (due to el energy level being near in energy to the X-valley of the AlAs), the energy level is altered when the electric field is applied to the heterostructure. Once the electric field is applied, the energy levels of the GaAs are decoupled from adjacent wells; thus, the e1 energy level of the GaAs wells is strongly confined. As discussed previously, this decoupling or shifting of the energy levels alters the absorption resonance of the heterostructure. Thus, the wavelength of any light incident to the heterostructure is altered.

Due to the decoupling (as opposed to the coupling) of the energy levels when an electric field is applied, the modulation of any incident light will be larger than any device previously disclosed.

BRIEF DESCRIPTION OF THE DRAWINGS

An embodiment of the present invention will now be described, by way of example, with reference to the accompanying drawings, in which.

It is noted that the diagramatic and schematic drawings herein are not drawn to scale. The particular dimensions such as thicknesses of the various layers of the multiple quantum well structure with regard to the remainder of the structure may have been exaggerated for purposes of illustration.

DETAILED DESCRIPTION OF THE INVENTION

Figure 1:
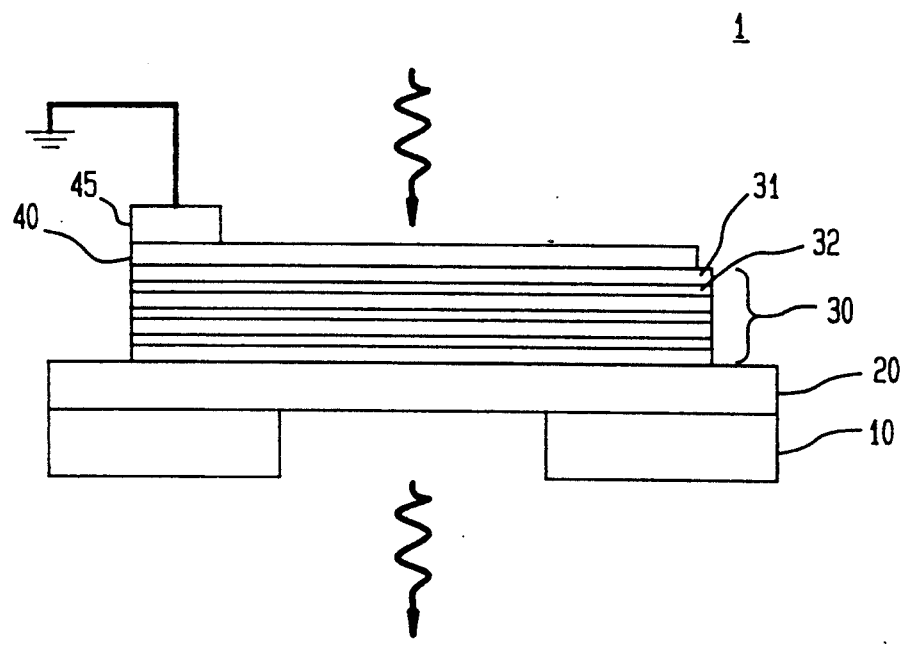
FIG. 1 is a diagrammatic cross-sectional view of a structure illustrating the present invention.
Figure 2A:
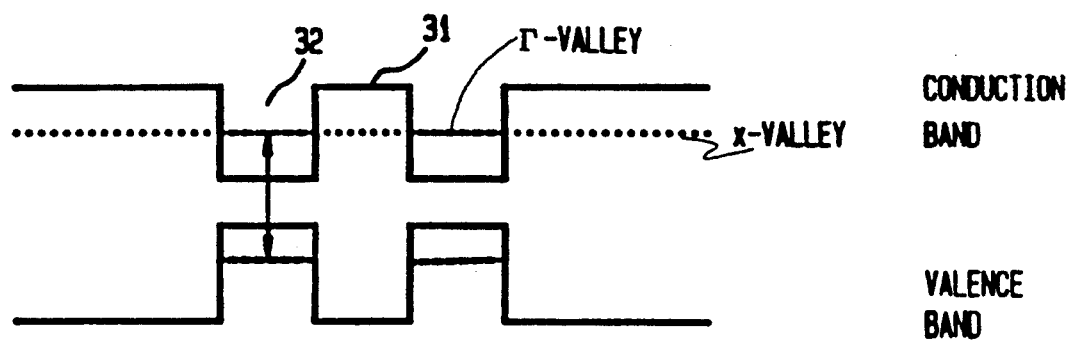
FIGS. 2a and 2b are schematic bandgap diagrams illustrating the operation of a method employing the present invention.

Referring now to FIG. 1, the present invention, as an optic modulator 1, comprises an n+substrate 10 with an opaque ohmic or Schottky contact 20, and a multiple quantum well structure 30 (MQWS) fabricated on the substrate 10. The MQWS 30 is comprised of alternating layers of Aluminum Arsenide (AlAs) 31, approximately 75 Angstroms in thickness, and Gallium Arsenide (GaAs) 32, approximately 40 Angstroms in thickness. The thicknesses and composition of the semiconductor layers given are merely given as examples and are not to be construed as a limitation except that the thicknesses of the alternating semiconductor layers 31 and 32 must be selected such that the e1 of the well layers (the confined electron level of the electron-hole pair between the conduction and valence bands) are near in energy to the X-valleys of the barrier layers 31. This correlation is shown in FIG. 2a by the dotted line. Thus, at zero field the quantum wells (the GaAs layers 32) are coupled and the heterostructure behaves much like a bulk material, i.e. the exciton absorption is not strong at room temperature.

In order to connect an appropriate power source to the device, approximately 80 Angstroms of Nickel-Gold (Ni-Au) 40 and a thicker 340 Angstrom tab of Ni-Au 45 are evaporated on the MQWS 30.

Figure 2B:
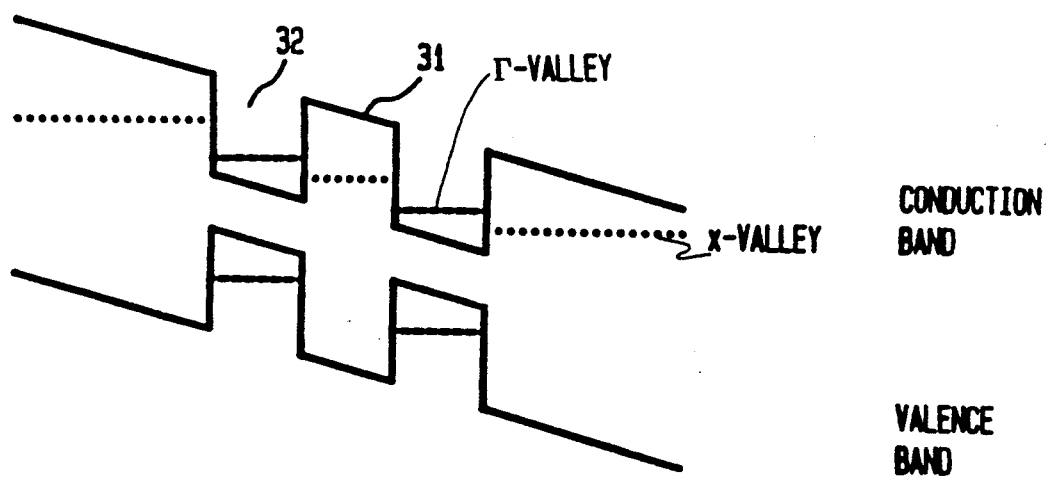

Referring now to FIGS. 2a and 2b, the present invention is schematically represented by illustrating the preferred correlation of the band gap energies of the conduction and valence bands between alternating layers of semiconductor material. FIG. 2a illustrates the preferred correlation at zero field wherein the solid lines represent the conduction and valence band energy levels for bulk GaAs and AlAs, the dashed lines represent the conduction and valence band energy levels for GaAs in a heterostructure (the lowest energy level, which is due to direct gap relation of the valence and conduction bands, is referred to as the γ state or valley), and the dotted lines represent the appropriate conduction and valence band energy levels for AlAs in a heterostructure (the lowest energy level, which is due to indirect gap relation between the energy bands of GaAs and AlAs, is referred to as the x state or valley).

As shown at zero field in FIG. 2a, the γ state of the conduction band of the GaAs layers 32 is near or equal in energy to the x state of the AlAs layers 31. Thus, electrons between the alternating layers are not strongly confined and the heterostructure behaves much like a bulk material. This effect is due to the band gap lineup caused by the selection of thickness of material described above. Generally, in luminescence the transition between the AlAs and GaAs layers is called an x1-hh1 type II transition and occurs because electron-hole transitions will most naturally occur only over a minimum "distance" of an energy level bandgap. Thus, because the x state of the valence band of AlAs is very low, the holes which would otherwise be present in the valence band are not created because the "distance" of the direct conduction-valence band gap of AlAs is much greater than the indirect conduction-valence band gap of the GaAs-AlAs interface.

When an electric field is applied, as shown in FIG. 2b, the corresponding energy levels of the adjacent semicondcutor layers 31 and 32 decouple, thereby strongly confining the energy levels between the adjacent semiconductor layers 31 and 32. As explained above, this shift in energy levels modulates the absorption wavelength of the heterostructure 1 and also modulates the intensity of any light passing through the heterostructure 1, because the electrons and holes are now strongly confined in the GaAs layers, and hence the absorption strength is higher.

Figure 3A:
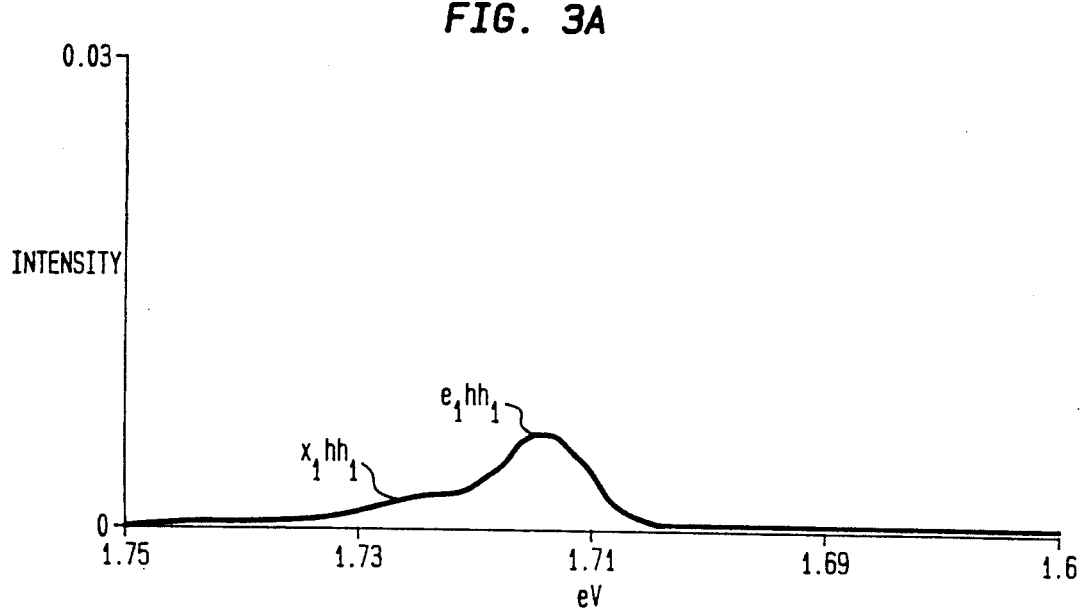
FIGS. 3a and 3b are graphs of luminescence wavelength versus applied electric field of test results for a sample constructed in accordance with the present invention.
Figure 3B:
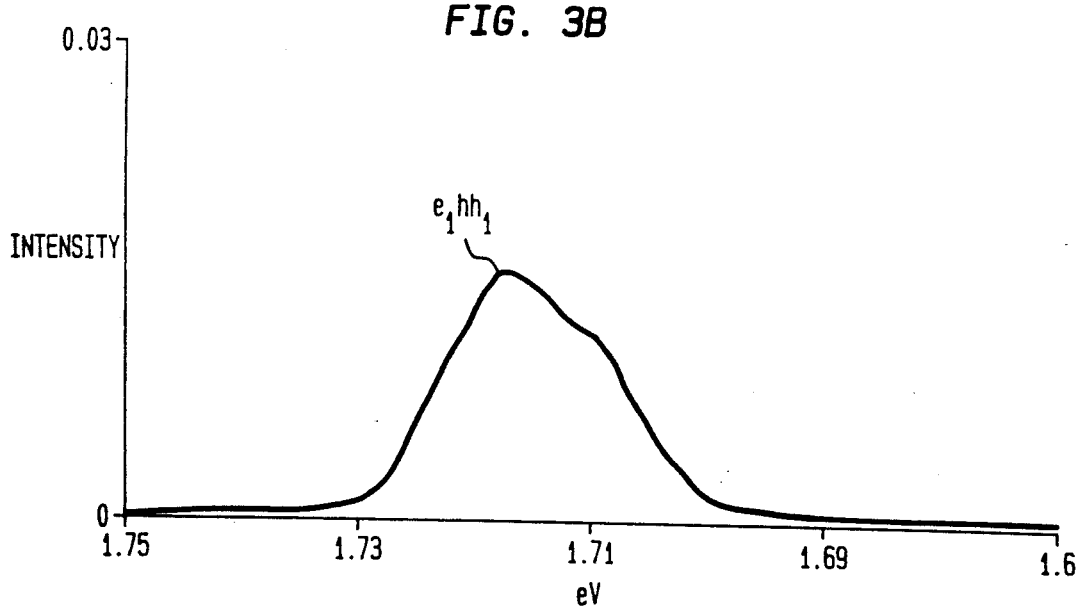

FIGS. 3a and 3b graphically represent light intensity (or luminescence emanating from the structure when above bandgap light strikes it,) versus electric field at zero field and at $2 \times 10^4$ v/cm, respectively. As is shown in FIG. 3a, both the x1-hh1 indirect and e1-hh1 direct transitions are present at zero field. However, in FIG. 3b, the sharp rise in intensity is only due to the e1-hh1 direct transition. As is shown, a relatively sharp rise in intensity is realized with only a comparatively small electric field.

This decoupling of the quantum wells and barriers is attributed to the electric field causing the localization of the delocalized electron. Hence, there is the dramatic increase of oscillation strength as the wave function of the e1 electron is confined in the quantum well. The effect is analogous to the Wannier-Stark ladders that have been observed when an electric field is applied to super lattice minibands. As opposed to the Wannier-Stark ladders, however, only the vertical (direct) transitions and first indirect transition occurs. The non-vertical transitions (due to the electrons and holes in adjacent wells and the next adjacent well) do not occur because of the large periodicity of the present invention and because of the heavy effective mass of the AlAs electron.

Although the present invention has been described in relation to a particular embodiment, many other variations and modifications and other uses will become apparent to those skilled in the art. Therefore, the present invention should not be limited by the specific disclosure herein, but only by the appended claims.

What is claimed is:

1. An optic modulator comprising:
  a multiple quantum well structure, the multiple quantum well structure comprising alternating layers of at least a first and second semiconductor material, the first and second semiconductor materials having predetermined band gap energy levels, compositions and thickcesses such that at zero electric field the θ state of the conduction band of the first semiconductor material is approximately equal to the x state of the second semiconductor material; and means to apply an electric field to the multiple quantum well structure.

2. An optic modulator as in claim 1, wherein the first semiconductor material is gallium arsenide and the second semiconductor material is aluminum arsenide.

3. An optic modulator comprising:
a substrate;
at least a first opaque ohmic contact applied on the substrate;
a multiple quantum well structure disposed on the substrate, the multiple quantum well structure comprising alternating layers of at least a first and second semiconductor material, the first and second semiconductor materials having predetermined band gap energy levels, compositions and thicknesses such that at zero electric field the $\theta$ state of the conduction band of the first semiconductor material is approximately equal to the x state of the second semiconductor material; and
at least a second opaque ohmic contact disposed on the multiple quantum well structure; and
a power source electrically connected to the first and second contacts.

4. The optic modulator as described in claim 3 wherein the first semiconductor is gallium arsenide and the second semiconductor is aluminum arsenide.

5. An optic modulator comprising:
a substrate;
at least a first Schottky contact applied on the substrate;
a multiple quantum well structure disposed on the substrate, the multiple quantum well structure comprising alternating layers of at least a first and second semiconductor material, the first and second semiconductor materials having predetermined band gap energy levels, compositions and thicknesses such that at zero electric field the $\theta$ state of the conduction band of the first semiconductor material is approximately equal to the x state of the second semiconductor material; and
at least a second Schottky contact disposed on the multiple quantum well structure; and
a power source electrically connected to the first and second contacts.

* * * * *